United States Patent [19]

Dean et al.

[11] Patent Number: 5,171,647
[45] Date of Patent: Dec. 15, 1992

[54] HYDROGEN CONTAINMENT COVER ASSEMBLY FOR SEALING THE CELL CAN OF A RECHARGEABLE ELECTROCHEMICAL HYDROGEN STORAGE CELL

[75] Inventors: Kevin Dean, Pontiac; Arthur Holland, Troy; Herbert C. Ovshinsky, Oak Park; Michael Fetcenko, Rochester Hills; Srinivasan Venkatesan, Southfield; Subnash Dhar, Rochester Hills, all of Mich.

[73] Assignee: Ovonic Battery Company, Inc., Troy, Mich.

[21] Appl. No.: 624,953

[22] Filed: Dec. 10, 1990

[51] Int. Cl.$^5$ .............................................. H01M 2/12
[52] U.S. Cl. ......................................... 429/54; 429/53; 429/57
[58] Field of Search ............................... 429/54, 53, 57

[56] References Cited

U.S. PATENT DOCUMENTS

| | | | |
|---|---|---|---|
| 4,271,241 | 6/1981 | Hooke et al. | 429/54 |
| 4,822,377 | 4/1989 | Wolff | 429/54 |

*Primary Examiner*—William R. Dixon, Jr.
*Assistant Examiner*—Sue Hollenbeck
*Attorney, Agent, or Firm*—Marc J. Luddy

[57] ABSTRACT

A resealable, ventable hydrogen impermeable cover assembly for sealing a rechargeable, metal hydride hydrogen storage alloy electrochemical cell. The cover assembly includes, inter alia, a multilayered vent septum comprising at least one layer of a substantially hydrogen impermeable, highly compressible material and at least one layer of a high durometer hardness material exhibiting low pressure hysteresis.

17 Claims, 3 Drawing Sheets

HYDROGEN CONTAINMENT COVER ASSEMBLY FOR SEALING THE CELL CAN OF A RECHARGEABLE ELECTROCHEMICAL HYDROGEN STORAGE CELL

FIELD OF THE INVENTION

The present invention relates generally to rechargeable, cylindrical electrochemical cells, and more particularly to rechargeable electrochemical cells with hydrogen storage negative electrodes having an improved, resealable vent cover assembly for preventing the escape of hydrogen gas from within the electrochemical cell.

BACKGROUND OF THE INVENTION

In rechargeable electrochemical cells weight and portability are important considerations. It is also advantageous for those cells to exhibit long operating life and be capable of operating without periodic maintenance. They may be used as direct replacements for primary AA, C and D cells in numerous consumer devices such as calculators, portable radios and flashlights. They are more often integrated into a sealed power pack designed to interface with or be an integral part of a specific device.

The rechargeable electrochemical cell is ideally suited to serve as a portable power source due to its small size, lightweight, high power capacity and long operating life. The rechargeable cell must operate as an "install and forget" power source. With the exception of periodic charging, a rechargeable cell should perform without attention, rarely becoming the limiting factor in the life of the device it powers.

Secondary cells using a rechargeable hydrogen storage negative electrode are known in the art. See, for example, U.S. Pat. No. 4,551,400 for HYDROGEN STORAGE MATERIALS AND METHODS OF SIZING AND PREPARING THE SAME FOR ELECTROCHEMICAL APPLICATIONS, the disclosure of which is incorporated herein by reference. Hydrogen storage cells operate in a different manner from lead-acid, nickel-cadmium or other prior art battery systems. Hydrogen storage electrochemical cells utilize a metal hydride negative electrode that is capable of reversibly electrochemically storing hydrogen. In one embodiment, the cell employs a positive electrode formed of nickel hydroxide material, although other positive electrode materials may be used. The negative and positive electrodes are spaced apart in an alkaline electrolyte, and may include a suitable separator, spacer, or membrane therebetween.

Upon application of electrical current to the negative electrode, the negative electrode material (M) is charged by the electrolyte decomposition of water to form the hydride and a hydroxide (OH) ion:

$M + H_2O + e^- \rightarrow M-H + OH^-$ (Charging)

Upon discharge, the hydride is decomposed, to release hydrogen within the cell, reacting with OH-ion to form water, and releasing an electron to the external circuit to provide an electric current:

$M-H + OH^- \rightarrow M + H_2O + e^-$ (Discharging)

The negative electrode reactions are reversible.

The reactions that take place at the positive electrode are also reversible. For example, the reactions at a conventional nickel hydroxide positive electrode as utilized in a hydrogen rechargeable secondary cell or battery are:

$Ni(OH)_2 + OH^- \rightarrow NiOOH + H_2O + e^-$ (Charging).

$NiOOH + H_2O + e^- \rightarrow Ni(OH)_2 + OH^-$

Hydrogen storage negative electrode cells are designed to operate with a nickel hydroxide positive electrode and a hydrogen storage alloy negative electrode, separated by non-woven, felted, nylon or polypropylene separator. The electrolyte is generally an alkaline electrolyte, for example, 20 to 45 weight percent potassium hydroxide, where lithium hydroxide may also be present in limited quantity.

A cell utilizing an electrochemically rechargeable hydrogen storage negative electrode offers important advantages over conventional secondary cells. Rechargeable hydrogen storage negative electrodes offer significantly higher specific charge capacities (both in terms of ampere hours per unit mass and ampere hours per unit volume) than do either lead negative electrodes or cadmium negative electrodes. As a result of the higher specific charge capacities, a higher energy density (in terms of watt hours per unit mass or watt hours per unit volume) is possible with hydrogen storage battery than is possible with the prior art systems, thereby making hydrogen storage cells particularly suitable for many commercial applications. Hydrogen storage cells are of two types, sealed cells and vented cells. In addition to differences in basic construction, as implied by the nomenclature, the two types of cells differ in their modes of operation. During normal operation, a sealed cell does not permit the venting of gas to the atmosphere. By way of contrast, in a vented cell, venting may be part of the normal operating behavior. As a result of this difference, the vent assemblies associated with each type of cell are quite different from one another, and the amounts of electrolyte in the cell container relative to the electrode geometry differ significantly.

Sealed cells are generally manufactured in many configurations, predominantly including cylindrical and rectangular. Sealed cells are designed to operate in a starved electrolyte configuration. That is, sealed cells are designed to operate with a minimum amount of electrolyte. The cell enclosure for a sealed cell is normally a metal enclosure designed for operation of up to about 100 pounds per square inch absolute or even higher. Sealed cells are characterized by the substantial absence of any required maintenance, though "one time" venting cells require some periodic maintenance.

By way of comparison, vented cells, which have a nickel hydroxide positive electrode, and a hydrogen storage alloy negative electrode, typically have a woven or nonwoven separator, e.g., of nylon or polypropylene. The vented cell differs most significantly from the sealed cell in that it is operated in a flooded condition. A "flooded condition" is defined herein to mean that the electrodes are completely immersed in, covered by, and wetted by the electrolyte. Thus, such cells are sometimes referred to as "flooded cells." A vented cell can be further distinguished from a sealed cell in that the vented cell is designed for normal operating pressures of only up to about 25 pounds per square inch, after which excess pressures are relieved by a vent mechanism.

The discharge capacity of the nickel positive electrode is limited by the amount of electrolyte, the amount of active material and charging efficiencies. The charge capacity of the negative, hydrogen storage alloy electrode is limited by the amount of active material used since its charge efficiency is nearly 100 percent until a nearly full state of charge is reached. To maintain the optimum capacity of the hydrogen storage electrode, precautions must be taken to avoid oxygen recombination or hydrogen evolution before full charge is reached. This is generally accomplished by providing an excess of negative electrode material. However, precautions must be taken in the design and fabrication of sealed cells to avoid effects of over-pressurization associated with overcharge at dangerously high charge rates.

Typically, rechargeable sealed cylindrical cells use a cylindrical nickel-plated steel case as the negative terminal and the cell cover as the positive terminal. The electrodes, are wound to form a compact "jelly roll" with the electrodes of opposite polarity isolated from each other by a porous separator. An insulator separates the positive cover from the negative cell can.

Conventional, cylindrical, rechargeable cell construction relies upon a tab which extends from one point on each plate. This creates a single current path through which current must be distributed to the entire electrode area during charging and discharging.

While rechargeable cells can be used without deleterious effect in most applications, there are many instances in which damage, of the type described hereinabove, may occur to the cells. For instance, during periods of abusive overcharging for extended lengths of time, excess pressure can be generated interiorly of the cell can. As the internal pressure increases, so also does the danger of an explosive failure. Accordingly, some means must be provided to safely release excess pressure, thereby avoiding the unsafe condition of container failure, which may be referred to as rupture.

Cylindrical, rechargeable cells of the prior art included a "one time only" venting mechanism where, for example, a rupturable diaphragm and blade apparatus was employed. As internal cell pressure increased, the blade was forced against the diaphragm. As the pressure further increased, the blade punctured the diaphragm, allowing excess gases to escape through the ruptured diaphragm. This destructive type of venting mechanism was both unpredictable from batch to batch and from cell to cell within a batch. Moreover, destructive venting is good for only one excess pressure situation. After the diaphragm is punctured it cannot even sustain normal cell operating pressures. In one embodiment of such "one time only" venting, the diaphragm is punctured by an upward driven plunger. In another embodiment, the diaphragm is forced upward towards the incising blade. As the internal cell pressure reaches the critical level, i.e., as the diaphragm reaches a critical deformation, the diaphragm is forced against the incising blade which would thus puncture the diaphragm, allowing the escape of accumulated cell pressure. An example of this type of device is fully disclosed in U.S. Pat. No. 3,415,690, the disclosure of which is incorporated herein by reference.

One shortcoming present in this and other methods of venting rechargeable electrochemical cells is that the venting mechanism present therein was a "one time only" mechanism. Once vent integrity is broken and the electrolyte material inside said rechargeable cell is exposed to the surrounding atmosphere, the electrolyte levels would be disturbed and thus the ability of the cell to retain and dispense an electrochemical charge would be deleteriously effected. Another shortcoming was the dependence of venting on the movement of a thin, deformable diaphragm against the incising blade.

Other prior art venting assemblies included square or polygonal shaped rubber stoppers, attached to a vented plate at three of the square's four corners. This assembly proved beneficial in that it was not a "one time only" mechanism. Unfortunately, this polygonal assembly either failed to reliably vent at a given internal cell pressure or "stuck" open, thereby causing the evaporation of the electrolyte material. This failure is attributable to the formation of a "pocket" by the stopper which prevented cell gases from properly venting. The result, of course, was failure of the rechargeable cell. An example of this type of ventable cover assembly is fully disclosed in U.S. Pat. No. 3,944,749, to Decker, et al, the disclosure of which is incorporated herein by reference.

Unfortunately, cell cover assemblies such as those disclosed by Decker, et al, or in U.S. Pat. No. 4,298,662 to Sugalski, et al are adapted for use in nickel-cadmium (Ni-Cd) cells, which cells do not evolve hydrogen at either the positive or negative electrode. Accordingly, the vent septum employed to seal the vent orifice of Ni-Cd cells is not capable of preventing the escape of hydrogen gas from the interior of metal-hydride hydrogen storage alloy electrochemical cells. Indeed, the present inventors have found that the ethylene propylene diene monomer (EPDM) commonly employed for the fabrication of vent septums in Ni-Cd cells (see for example Sugalsi, et al, Column 5, lines 53–57) is quite hydrogen permeable at pressures well below the designed vent release pressure, and is therefore wholly inadequate for purposes of preventing hydrogen leakage from hydrogen storage electrochemical cells. It is important to note that, as used herein, the term "hydrogen impermeable" refers not only to the loss of hydrogen occasioned by the diffusion of hydrogen through the vent system, but also the loss of hydrogen resulting from inadequate sealing between the vent septum and the vent orifice, thus allowing hydrogen to seep therethrough.

In selecting an appropriate hydrogen impermeable material, several factors must be taken into account, for example:

1. Thin profile for minimum compression deformation;
2. Elasticity for maximum conformation to a sealing surface;
3. Low coefficient of hydrogen permeation;
4. Resiliency for surviving the geometric deformation induced by enclosure and rupture from pressure;
5. Atmospheric compatibility to elevated caustic vapors; and
6. Temperature compatibility to withstand the elevated temperature experienced in many situations.

The only material suitable for accomplishing factors 1, 2, and 4–6 is silicone. However, silicone is woefully inadequate for purposes of preventing hydrogen permeation.

Accordingly, there exists a need for a sealable cover assembly including a venting mechanism whereby excessive internal cell pressures can be vented off or released from the rechargeable metal-hydroxide hydrogen storage alloy cells at predictable pressures without destruction of the cells, as by permanently exposing the electrolyte inside the electrochemical cells to ambient conditions. Especially important is the requirement that the venting mechanism include a vent septum which is hydrogen impermeable, i.e., forms a seal with the vent orifice which resists hydrogen leakage.

BRIEF SUMMARY OF THE INVENTION

There is disclosed herein a cover assembly for sealing the cell can of a rechargeable cylindrical electrochemical cell. The cover assembly of the instant invention includes a circular cover plate having a vent opening formed therethrough, preferably adjacent the center of said plate. The vent opening or orifice is preferably annularly radiused so as to minimize localized stress, thus assuring superior sealing between said orifice and a vent septum disposed thereover, while discouraging tears and perforations in said septum. Such tears or perforations would of course allow for the leakage of hydrogen gas and electrolyte from the interior of the electrochemical cell.

The cover assembly also includes a circular, compressible, electrically insulating ring sealably affixed along the circumference thereof. Venting occurs through a hydrogen permeable disc-shaped, high durometer hardness, multilayered vent septum. The multilayered vent septum is preferably fabricated of at least one layer of a low hydrogen permeable, highly flexible material and at least one layer of a high durometer hardness material having low pressure hysteresis and operatively disposed atop the vent orifice. It is to be understood that for purposes of the instant disclosure the term "hydrogen impermeable" means that hydrogen escape is prevented through the vent septum itself and as a result of poor sealing between the septum and the vent orifice.

In order to assure that hydrogen is contained within and does not escape from the cell, the multilayered vent septum is formed of different materials, each of which serves a different function. For example, in order to prevent hydrogen permeation, a layer of highly flexible, substantially hydrogen impermeable material, preferably 0.002" to 0.015" thick Buna-N nylon, is employed. In order to assure superior sealing between the vent septum and the vent orifice and uniform pressure venting, a layer of 0.040" to 0.100" thick carbon bonded silicone is employed. In one preferred embodiment, the multilayered vent septum is a tri-layered system including about a 0.080" thick layer of carbon bonded silicone sandwiched between two layers of about 0.008" thick Buna-N nylon.

Disposed over the vent septum is a hood cap which is attached to said cover plate, preferably by a projection weld.

The cover plate of the cover assembly may further include at least one axial stiffening rib formed therein, so as to enable said plate to withstand internal cell pressures which may reach as high as 600 pounds per square inch before venting and without substantial deflection of the cover plate.

The dimensions of the disc-shaped, multilayered vent septum of the instant invention are specifically selected to hold pressure below a predetermined pressure range, and to vent internal cell pressure above that predetermined pressure range. The disc-shaped, silicone vent septum is dimensioned to be approximately 2 times the diameter of the vent orifice formed in the cover plate.

The silicone vent septum is operatively disposed directly atop the vent orifice so as to substantially cover the annularly radiused vent orifice and protrude slightly therethrough. This configuration of multilayered vent septum and vent orifice has proven to provide a truly hydrogen impermeable seal. It is important to note however, that the multilayered vent septum must be compressibly deformable in response to pressures generated inside said electrochemical cell. Ideally, said vent septum should be compressably deformable in response to pressures of between 200 and 600 psi, and more preferably to pressures within the range of 350 to 550 psi. Further, the vent septum should have a durometer hardness of about 70Å to 90Å. Also, it should have a maximum compression set of no more than 10%. In a vent cap assembly which is adapted for hydrogen confinement, it is particularly important to provide a vent septum fabricated from a high density, low compression set medium. However, silicone based materials, as a group typically display increasing compression with increased durometer hardness.

The vent septum is held adjacent the vent orifice by the hood cap, which, as described above, encloses the vent septum along the top and sides thereof with the bottom thereof being in contact with the cover plate and the cover orifice. It is important to note that the geometry of the hood cap should be such that the ratio of hood cap volume to vent septum volume is greater than about 2:1, and preferably about 3:1; and the percent compression of the vent septum is less than about 30%. The hood cap may then be projection welded to said cover plate.

DETAILED DESCRIPTION OF THE INVENTION

Figure 1:
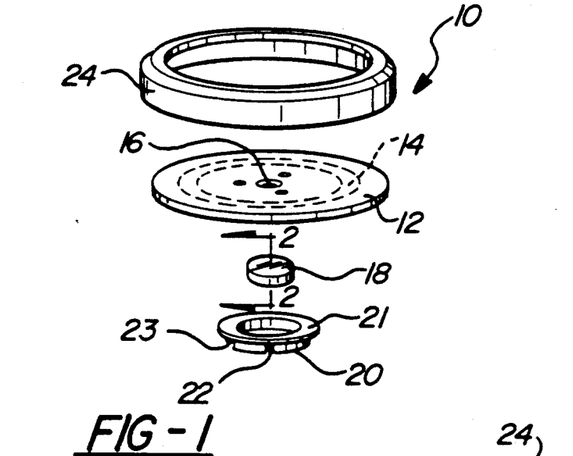
FIG. 1 is an exploded perspective view illustrating the cover assembly of the instant invention, said cover assembly including a cover plate, a vent septum, a hood cap and an insulating ring.

FIG. 1 illustrates the component parts of a cover assembly for a cylindrical electrochemical cell, said cover assembly generally depicted by the reference numeral 10. The cover assembly 10 includes four discrete components. The first component is a generally circular, generally planar reinforced cover plate 12, typically fabricated from a metallic, conductive material such as steel, nickel, copper or combinations thereof, and most preferably nickel-plated steel.

The cover plate 12 may further include an annularly shaped stiffening rib 14 for reinforcing the generally planar surface of the plate 12 in the event said plate experiences excessive internal cell pressures. The cover plate 12 further includes a vent orifice 16 which typically takes the form of a perforation or hole formed approximate the center thereof. The orifice or perforation should be annularly radiused so as to prevent sharp edges from rupturing the vent septum and thereby allowing hydrogen leakage.

The second discrete component of the cover assembly 10 is a circularly shaped (though other nonparallel sided shapes may also be employed), generally planar, compressably deformable multilayered vent septum 18. The multilayered vent septum 18 is disposed adjacent the vent orifice 16 of the cover plate 12. The multilayered vent septum 18 must be characterized by high durometer hardness, low compression set and low shear. "Hydrogen impermeable," as used herein, means that the vent septum is resistant to both hydrogen diffusion therethrough and hydrogen leakage occasioned by the formation of a poor seal between the septum and the vent orifice.

Additionally, the multilayered vent septum 18 20 should have a diameter of less than about ½ of the diameter of the hood cap 10 (which is the third discrete component of the cover assembly and will be detailed hereinbelow), and preferably less than ⅓ of the hood cap diameter. The vent septum 18 also must be compressibly deformable in response to internal cell pressures, which pressures are within the range of about 200–600 pounds per square inch, and preferably is compressibly deformable at pressures between about 350 and 550 pounds per square inch. It is especially preferred that said vent septum 18 is compressibly deformable at pressures of approximately 450 pounds per square inch. The multilayered vent septum 18 will also be discussed in greater detail hereinbelow with respect to FIG. 2.

The vent septum 18 is held in place atop the vent orifice 16 of the cover plate 12 by means of a hood cap 20. More specifically, the hood cap 20 compresses the vent septum for the slight protrusion thereof through the vent orifice 16 so as to assure complete closure of said orifice. The geometric configuration of the hood cap 20 should be such that the cap 20 urges the multilayered vent septum 18 against the cover plate 12 at a net compression of less than about 35%. Also, the ratio of the volume of the hood cap 18 to the volume of the septum 18 should be between about 2:1 and 10:1 and preferably about 3:1 to 10:1. This compression ratio will assure that adequate volume for expansion exists, and accordingly adequate sealing. The hood cap 20 includes a generally planar annular portion 21 and a spacedly disposed generally planar circular face 23. The circular face 23 of the hood cap 20 includes at least one vent opening 22. The hood cap 20 can thus be disposed so as to encapsulate three sides of said vent septum 18, and urge the upper surface of said septum 18 into intimate contact with the cover plate 12 of the reinforced cover assembly 10. Thereafter, said hood cap 20 may be affixed to the periphery of the cover plate 12 by means of a metallurgical process, e.g. a projection welding process.

The fourth and final discrete component of the cover assembly 10 is a generally annularly shaped, compressible, electrically insulating ring 24. The ring 24 is sized and shaped to be sealably affixed along the circumferential extent of the cover plate 12. The insulating ring 24 is typically fabricated of a polymeric material, such as nylon or polysulfone, which is electrically insulating and is capable of being deformed by the application of pressure thereto. The insulating ring 24 further includes a locking lip (not shown) which allows the ring 24 to be frictionally snapped into position around the cover plate 12.

Figure 2:
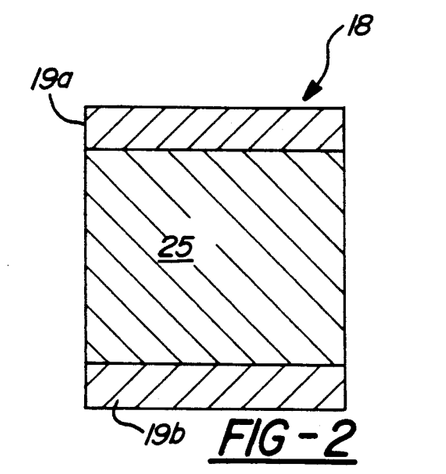
FIG. 2 is a cross-section view taken along line 2—2 of FIG. 1 and illustrating the multilayered vent septum of the instant invention.

Referring now to FIG. 2, there is illustrated therein, in the cross-sectional view, the hydrogen impermeable multilayered vent septum 18 of the present invention. More particularly, the vent septum 18 includes first and second, spacedly disposed layers of substantially hydrogen impermeable, highly flexible material 19a and 19b. Layers 19a and 19b are preferably formed of a relatively thin Buna-N nylon reinforced material such as FAIROPRENE (registered trademark of Fairchild Manufacturing, Inc.). The layers 19a and 19b are typically between about 0.002" and 0.015" thick and preferably about 0.008" thick. Sandwiched between said layers 19a and 19b is a layer formed of a high durometer hardness, low pressure hysteresis material 25. The high durometer hardness, low pressure hystersis material is provided to assure good sealing, while reliably venting to atmosphere at uniform pressures. One preferred material from which layer 21 can be fabricated is a carbon bonded silicone having a thickness of between about 0.040" and 0.100," and preferably about 0.080".

Figure 3A:
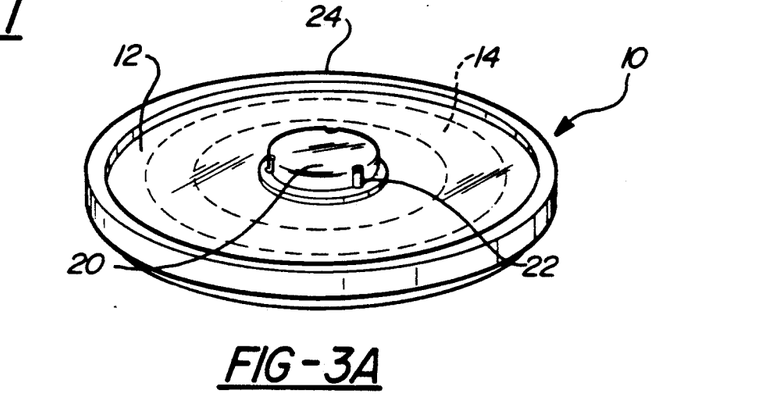
FIG. 3A is a top perspective view illustrating the fully assembled cover assembly of the instant invention.
Figure 3B:
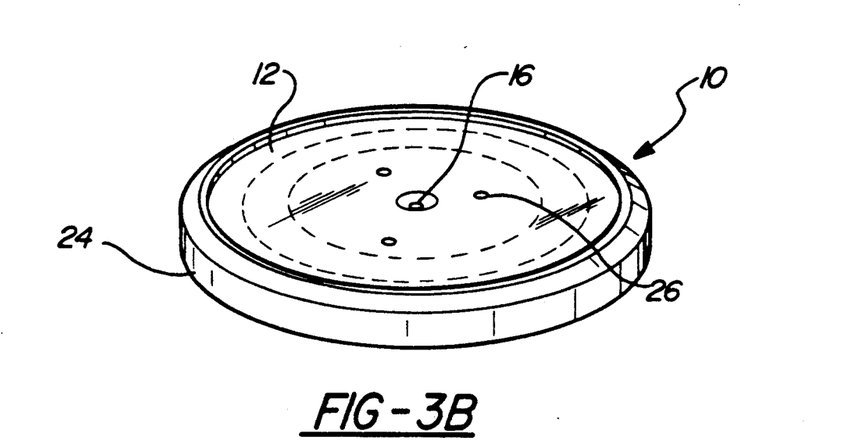
FIG. 3B is a bottom perspective view illustrating the fully assembled cover assembly of the instant invention.

Turning now to FIG. 3A, there is illustrated a top perspective view of the cover assembly 10 including the insulating ring 24, the cover plate 12, and the hood cap 20. FIG. 3B is a bottom perspective view of an assembled cover assembly 10 including the insulating ring 24 and the cover plate 12 having the vent orifice 16 formed therethrough. Also, illustrated are protrusions 26 which form a base upon which the hood cap 20 may rest, and to which said hood cap is welded.

A cover assembly 10 of the type described hereinabove is specifically adapted to provide a permanent seal when employed in combination with the cell can of a rechargeable cylindrical metal hydride, hydrogen storage alloy electrochemical cell, thereby being capable of reliably and uniformly venting excessive internal pressure of an electrochemical cell. The vent septum 18 of the instant invention is resistant to both hydrogen diffusion therethrough, and hydrogen leakage resulting from poor sealing with the vent orifice. This novel feature significantly improves cycle life by preventing state of charge imbalances resulting from hydrogen leakage through the vent system. Additionally, reduced leakage of hydrogen lessens the possibility of hydrogen build-up (and hence explosion) in enclosed areas, such as multi-cell battery cases. The reinforced cover assembly illustrated herein is further adapted to function as the positive terminal of the rechargeable electrochemical cell, in that it is electrically isolated from the cylindrical cell can of said electrochemical cell, which cell typically functions as the negative terminal of the rechargeable cell.

Figure 4:
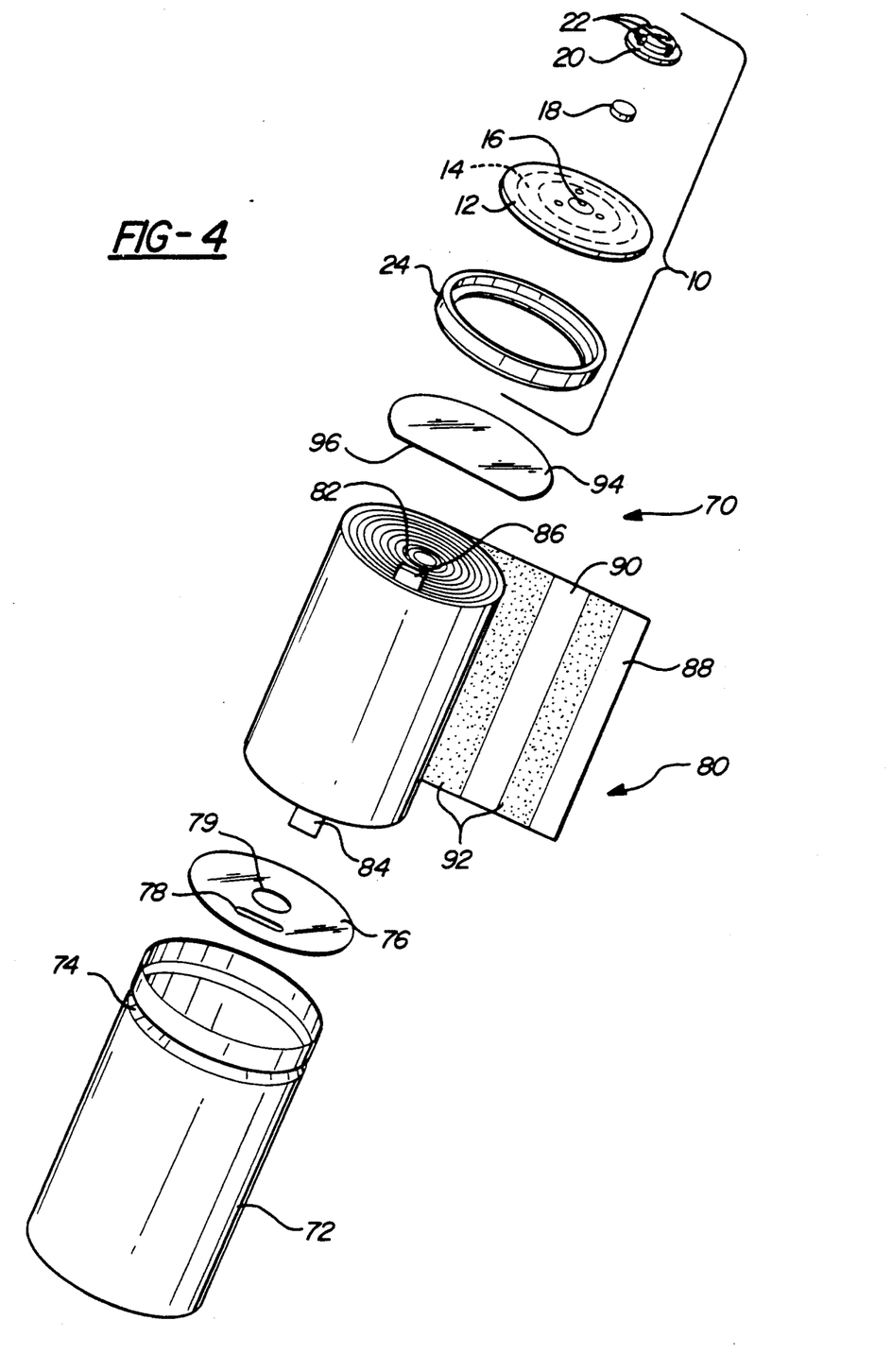
FIG. 4 is an exploded perspective view of a rechargeable, ventable hydrogen storage alloy electrochemical cell including the cover assembly of the instant invention.

In FIG. 4 there is illustrated, in an exploded perspective view, a cylindrical ventable metal hydride, hydrogen storage alloy electrochemical cell for the storage of electrochemical energy. The electrochemical cell 70 is specifically adapted to be sealed by the cover assembly described hereinabove. Specifically, the cover assembly 10 of FIGS. 1-3 is employed so as to provide a ventable, hydrogen impermeable seal for the rechargeable electrochemical cell. The cover assembly 10 includes the hood cap 20, preferably fabricated from nickel plated steel. The hood cap 20 additionally includes one and preferably three vent holes 22 adapted to permit the escape of internally generated pressure. The cover assembly 10 further includes the hydrogen impermeable, disc-shaped vent septum 18 of the instant invention which is formed of high durometer hardness, low compression set, low shear material. The vent septum 18 is compressibly deformable at imposed pressures in excess of at least about 300 psi. More preferably, the vent septum 18 should be compressibly deformable at internal cell pressures in the range of about 350 to 550 pounds per square inch.

The electrochemical cell 70 further includes a cell can 72 which is typically a nickel-plated steel case operatively shaped in a cylindrical configuration. The cylindrical nickel-plated steel case employed as the cell can 72 is further adapted to function as the negative terminal of the rechargeable electrochemical cell. The cell can 72 further includes a stiffened sealing lip 74 formed near the top of the cylindrical cell wall portion thereof. The stiffened sealing lip 74 is adapted to support and seal the cover assembly 10 described hereinabove. Disposed inside said cylindrical can 72 is an insulator pad 76 which is adapted to substantially electrically insulate the cylindrical cell can 72 from an electrode roll 80 also operatively disposed therewithin. Specifically, the electrical insulator pad 76 is formed as a thin, generally planar insulator plate of an organic, polymeric material having a slotted cutout portion 78 which provides electrical contact between the negative electrode tab 84 of the jelly roll and the cell can 72. In a preferred embodiment, the insulator pad is about 0.010" thick, type 6 nylon, and further includes a small hole 79 through the center thereof. The through-hole 79 facilitates welding of the electrical contact tab 84 to the cell can 72.

The electrochemical cell 72 further includes a nickel positive electrode and a metal hydride, hydrogen storage negative electrode, said electrodes isolated from one another by a separator. Said electrodes and separator are wound into a jelly roll electrode unit 80. The jelly roll electrode unit 80 specifically comprises a negative electrode 88 which is itself a reversible multicomponent, multiphase electrochemical hydrogen storage alloy comprising, for example, titanium, vanadium zirconium, nickel and chromium and having the nominal composition; $(Ti_{2-x}Zr_xV_{y-y}Ni_y)_zCR_{1-z}$, where the value of $(Ti_{2-x}Zr_xV_{4-y}Ni_y)_z$ is normalized to 1; 0.0 is less than or equal to x which is less than or equal to 1.5; 0.6 is less than or equal to y which is less than or equal to 3.5; and z is an effective amount equal to less than 20% of the alloy. The hydrogen storage alloy is capable of electrochemically charging and discharging hydrogen in the alkaline aqueous media, the electrolytic material discussed hereinafter, vanadium and said multicomponent hydrogen storage phase normally being soluble in the alkaline, aqueous media and the chromium acting to inhibit the solubilization of vanadium into the aqueous alkaline media. Hydrogen storage electrodes of this type are fully disclosed in U.S. Pat. No. 4,728,586, to Venkatesan, et al, the disclosure of which is incorporated herein by reference.

The jelly roll electrode unit 80 further comprises the positive electrode 90 which is typically fabricated from a nickel hydroxide material, of a type commonly known in the art. Also included in the jelly roll electrode unit 80 is a separator 92 which is positioned between the negative electrode 88 and the positive electrode 90. The separator is typically formed of a felted or non-woven material such as nylon, having a thickness in the range of about 0.05 to 0.020 inches. It is important to note that while nylon is a preferred separator material, other materials may be employed with equal advantage. Whatever material is chosen as the separator 92, it is necessary that it be thick enough to prevent electrical shorting between the positive an negative electrodes 88 and 90, but not so thick as to present problems of electrolyte transmissibility. Additionally, the separator 92 may not be so thick as to present high electrical resistance in the jelly roll configuration. The jelly roll electrode unit 80, which is attachable to the negative electrode plate, is adapted to extend through the cutaway section 78 of the insulator pad 76 so as to affect electrical contact with the cell can 72. The jelly roll electrode unit 80 is further equipped with a positive electrode contact tab 86, attachable to the positive electrode, and adapted to affect electrical contact with the cover assembly 10 of the electrochemical cell.

Also disposed in the cell can 72, so as to wet and flood the jelly roll electrode unit 80, is an electrolyte material (not shown). The electrolyte material is an aqueous alkaline solution, for example, a solution of distilled water containing from about 20 to about 40 percent potassium hydroxide.

Disposed atop the jelly roll electrode unit 80, inside the cell can 72, is a second electrical insulator pad 94 having a cut away secant portion 96 which allows the electrical contact tab 86 of the positive electrode to extend therepast and electrically communicate with the cover assembly 10, thereby making said cover assembly 10 the positive terminal of the cell. The electrical insulator pad 94 is similar to the insulator pad 76 discussed hereinabove in that it is typically fabricated from electrically insulating material, such as an organic polymeric insulator, e.g., nylon.

EXAMPLES

Example 1

The vent cap assemblies employed herein were identical to one another except for the material from which the vent septum was fabricated. These vent cap assemblies, after being assembled in the aforedescribed cell cans, were subjected to a hydrogen gas leak rate test in which the cans were immersed in oil and escaping gas was collected in an inverted beaker. In all cases, the metal-hydride hydrogen storage alloy negative electrode material was a VTiZrNCr alloy.

More particularly, all vent caps were placed into the vacuum part of an automatic helium leak detector. The vacuum achieved was $2.7 \times 10^{-10}$ torr. Helium was then introduced at a pressure of 14.7 PSIA for 5 minutes. The helium leak rate was measured using a Veeco Model MS-170 helium leak detector. Before testing, the unit was calibrated using a Veeco Model SC-4 standard leak source with a rate of $5.4 \times 10^{-8}$ cm$^3$/second. The measured leak rate values for each septum material are listed below.

| Material Type | Leak Rate (cc/sec) |
| --- | --- |
| A. Silicone | $8.7 \times 10^{-8}$ |
| B. Carbon-Bonded Silicone | $2.1 \times 10^{-8}$ |
| C. Silicone with a Nylon/ Buna Laminate | $1.5 \times 10^{-9}$ |
| D. Carbon-Bonded Silicone with a Nylon/Buna Laminate | $3.3 \times 10^{-9}$ |

Example 2

C size electrochemical cells of standard internal construction were tested for leak rate with a variety of varying vent cap assembly constructions.

All of said electrochemical cells underwent continuous overcharge at 350 milliamps. Gas was collected by immersing the cells in oil and collecting any escaped gas under an inverted beaker. The leak rate data over 24 hours of testing are provided herein below.

| Material | Leak Rate in cc/24 hrs |
|---|---|
| A. Cover Plate (no hole) | Cell 1: 0.01 |
| | Cell 2: 0.008 |
| | Cell 3: 0.011 |
| B. Standard Silicone | Cell 1: 0.8 |
| | Cell 2: 0.6 |
| | Cell 3: 7.6 |
| C. EPDM | Cell 1: 2100 |
| D. Silicone with a Teflon Coating | Cell 1: 0.7 |
| | Cell 2: 1.5 |
| | Cell 3: 0.3 |
| | Cell 4: 0.7 |
| E. Silicone Septum with a mechanically polished cover plate | Cell 1: 0.75 |
| | Cell 2: 0.5 |
| | Cell 3: 0.75 |
| | Cell 4: 0.6 |
| | Cell 5: 0.9 |
| | Cell 6: 0.3 |
| F. Silicone with nylon laminate | Cell 1: 0.007 |
| | Cell 2: 0.014 |
| G. Silicone with an asphalt | Cell 1: 0.7 |
| H. Silicon with a vacuum grease laminate | Cell 1: 1.0 |
| | Cell 2: 0.8 |
| | Cell 3: 0.9 |
| | Cell 4: 2.5 |
| I. Silicone with an evaporated copper laminate | Cell 1: 1.3 |
| | Cell 2: 0.7 |
| J. Silicone with a sputtered copper laminate | Cell 1: 0.09 |
| | Cell 2: 0.08 |

Example 3

The same experiment as detailed in Example 2 immediately hereinabove was repeated with the following materials and gave the following results.

| Material | Leak Rate in cc/24 hrs |
|---|---|
| A. Standard Silicone | Cell 1: 0.8 |
| | Cell 2: 1.0 |
| B. Silicone with a nylon laminate | Cell 1: 0.00 |
| | Cell 2: 0.10 |
| C. Silicone with a sputtered copper coating | Cell 1: 0.15 |
| | Cell 2: 0.6 |
| | Cell 3: 0.4 |
| | Cell 4: 0.9 |
| | Cell 5: 1.0 |

Example 4

To reproduce the hydrogen containment results detailed hereinabove on large sample sizes, a plurality of identical C-size electrochemical cells were constructed, each cell including a negative electrode formed of metal hydride, hydrogen storage alloy material. All cells were subjected to continuous overcharge for 2 weeks.

Leak rates in this example were determined by weight loss measurements. Since even small quantities (by weight) of hydrogen escaping from the cells can dramatically affect the internal charge balance, the improvement due to the use of "old septums" versus "new septums" can be readily observed from a perusal of the graph of FIG. 5.

In this example, "old septum" refers to standard vent septums of the prior art which were fabricated from a single layer of silicone. In comparison thereto, "new septum" refers to the novel multi-layer composite septum of the instant invention which is fabricated from had a layer of silicone with a nylon/buna composite laminated thereto.

Figure 5:
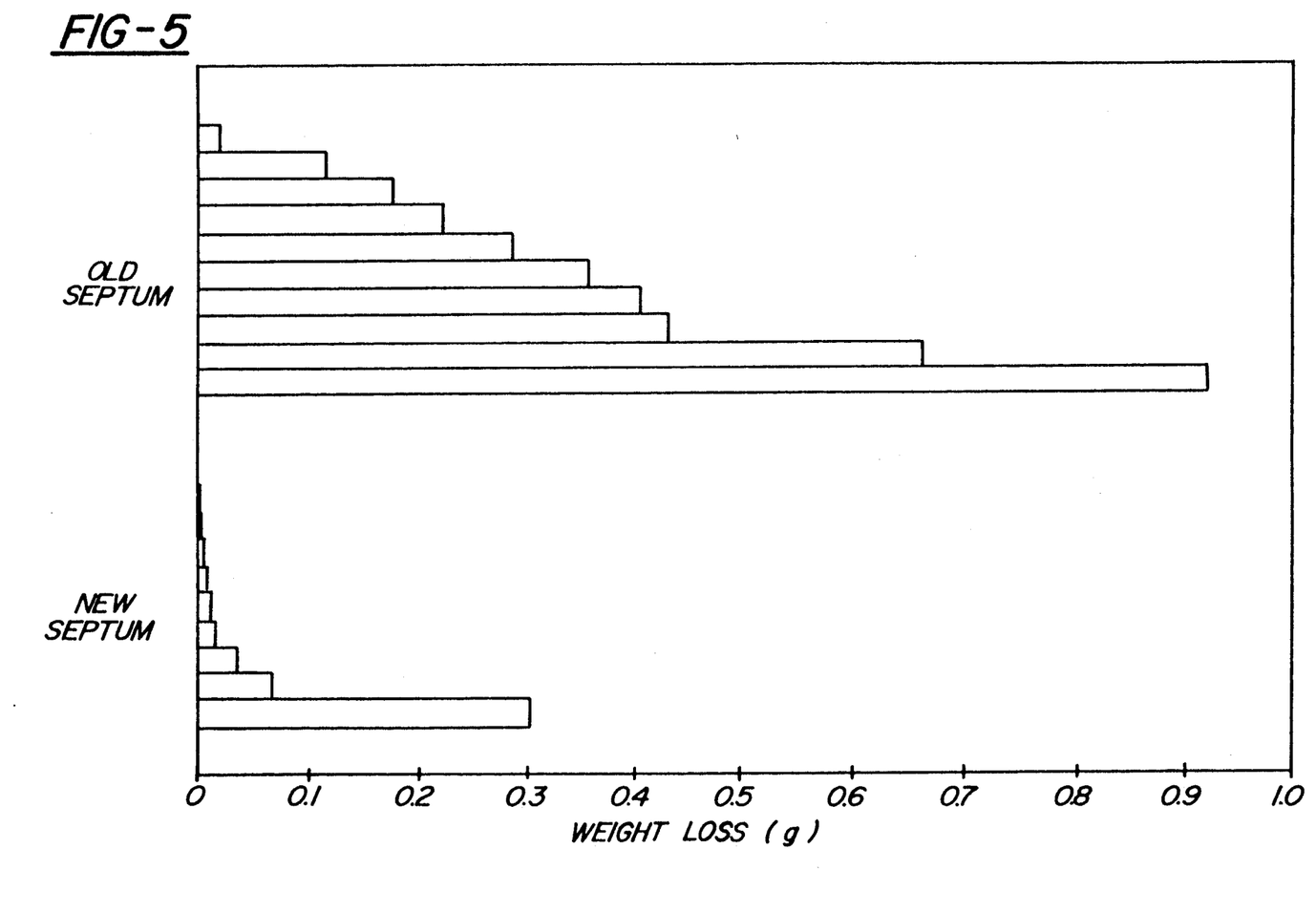
FIG. 5 is a graph of electrochemical cells utilizing old vent septums and cells utilizing the new vent septums of the instant invention plotted on the ordinate vs. weight loss plotted on the abscissa.

The graphical historgram of FIG. 5 is reproduced hereafter in tabular form.

| Old Septum (grams) | New Septum (grams) |
|---|---|
| 0.428 | 0.011 |
| 0.180 | 0.011 |
| 0.225 | 0.003 |
| 0.405 | 0.038 |
| 0.118 | 0.010 |
| 0.922 | 0.001 |
| 0.357 | 0.008 |
| 0.287 | 0.070 |
| 0.023 | 0.009 |
| 0.666 | 0.301 |

Finally, it is to be noted that the vent mechanism disclosed and claimed herein functions effectively under catastrophic conditions, such as being thrown into a fire or being short circuited. If the pressure is not released, the battery will explode. The design of the new and improved vent structure has been tested under such catastrophic conditions with excellent results.

While the invention has been described with respect to certain preferred embodiments thereof, it is not intended to limit the scope of the invention thereby, but solely by the claims appended hereto, and all reasonable equivalents thereof.

We claim:

1. A hydrogen impermeable resealable cover assembly for sealing the cell can of a rechargeable, cylindrical, metal hydrogen storage alloy electrochemical cell, said cover assembly comprising:
   a circular cover plate including an annularly radiused vent orifice formed therethrough;
   a circular, compressible, electrically insulating ring sealably affixed along the circumference of said cover plate;
   a vent septum having at least one layer of low hydrogen permeable highly flexible material and at least one layer of a high furometer hardness material having low pressure hysteris, compressibly deformable in response to internal cell pressure, said septum disposed atop said vent orifice; and
   a hood cap including vent openings operatively positioned over said vent septum.

2. A cover assembly as in claim 1, wherein said at least one layer of low hydrogen permeable, highly flexible material is a butadiene acrylonitrile rubber reinforced material.

3. A cover assembly as in claim 2, wherein said layer of butadiene acrylonitrile rubber reinforced material has a thickness of between 0.002" and 0.015".

4. A cover assembly as in claim 3, wherein said layer of butadiene acrylonitrile rubber reinforced material has a thickness of about 0.008".

5. A cover assembly as in claim 2, wherein said layer of high durometer hardness material is formed of carbon bonded silicone.

6. A cover assembly as in claim 5, wherein said layer of carbon bonded silicone has a thickness of between 0.040" and 0.0100".

7. A cover assembly as in claim 1, wherein said vent septum comprises a first layer of butadiene acrylonitrile rubber, a layer of carbon bonded silicone, and a second layer of butadiene acrylonitrile rubber.

8. A cover assembly as in claim 1, wherein said electrically insulating ring is formed of an electrically insulating polymeric material.

9. A cover assembly as in claim 8, wherein said electrically insulating polymeric material is polysulfone.

10. A cover assembly as in claim 1, wherein said cover plate is fabricated from nickel plated steel.

11. A cover assembly as in claim 1, wherein said vent septum is disposed upon said vent orifice so as to substantially cover and protrude through said vent orifice.

12. A cover assembly as in claim 11, wherein said vent septum has a diameter which is at least about one half the diameter of the hood cap.

13. A cover assembly as in claim 12, wherein said vent septum is substantially compressibly deformable at pressures between about 350 to 550 psi.

14. A cover assembly as in claim 13, wherein said multilayered vent septum is substantially compressibly deformable at pressures of about 450 psi.

15. A cover assembly as in claim 1, wherein the geometry of said hood cap is such as to urge said vent septum against said cover plate at a net compression of less than 35%.

16. A cover assembly as in claim 15, wherein the ratio of the volume of said hood cap to the volume of said vent septum is between 10:1 and 2:1.

17. A cover assembly as in claim 1, wherein said hood cap is welded to said cover plate.

* * * * *

UNITED STATES PATENT AND TRADEMARK OFFICE
CERTIFICATE OF CORRECTION

PATENT NO. : 5,171,647
DATED : December 15, 1992
INVENTOR(S) : Dean, et. al.

It is certified that error appears in the above-indentified patent and that said Letters Patent is hereby corrected as shown below:

Column 7, line 21, delete "20".

Column 12, line 40, after "metal", insert --hydride--.

Column 12, line 49, delete "furometer" and insert --durometer--.

Signed and Sealed this

Nineteenth Day of October, 1993

Attest:

BRUCE LEHMAN

*Attesting Officer*   *Commissioner of Patents and Trademarks*